(12) United States Patent
Sugihara (10) Patent No.: US 10,147,198 B2
(45) Date of Patent: Dec. 4, 2018

(54) MEASUREMENT DEVICE

(71) Applicant: Shinano Kenshi Co., Ltd., Nagano (JP)

(72) Inventor: Hiroaki Sugihara, Nagano (JP)

(73) Assignee: SHINANO KENSHI CO., LTD., Nagano (JP)

( * ) Notice: Subject to any disclaimer, the term of this patent is extended or adjusted under 35 U.S.C. 154(b) by 87 days.

(21) Appl. No.: 15/306,683

(22) PCT Filed: Apr. 27, 2015

(86) PCT No.: PCT/JP2015/062708
§ 371 (c)(1),
(2) Date: Oct. 25, 2016

(87) PCT Pub. No.: WO2015/166915
PCT Pub. Date: Nov. 5, 2015

(65) Prior Publication Data
US 2017/0046854 A1    Feb. 16, 2017

(30) Foreign Application Priority Data

Apr. 30, 2014 (JP) ................................. 2014-094105
Apr. 27, 2015 (JP) ................................. 2015-090203

(51) Int. Cl.
*G06T 7/60*     (2017.01)
*G01C 15/06*    (2006.01)
(Continued)

(52) U.S. Cl.
CPC .............. *G06T 7/60* (2013.01); *G01B 11/002* (2013.01); *G01B 11/2504* (2013.01);
(Continued)

(58) Field of Classification Search
None
See application file for complete search history.

(56) References Cited

U.S. PATENT DOCUMENTS 6,389,158 B1    5/2002  Pettersen et al.
6,392,754 B1 *  5/2002  Pingel .................. G01B 11/255
                                                    356/239.1
(Continued)

FOREIGN PATENT DOCUMENTS

JP    2002-082763 A    3/2002
JP    2004-044372 A    2/2004
(Continued)

OTHER PUBLICATIONS

The above references were cited in an Extended European Search Report dated Nov. 16, 2017, which is enclosed, that issued in the corresponding European Patent Application No. 15 78 5495.

*Primary Examiner* — Frederick D Bailey
(74) *Attorney, Agent, or Firm* — Cowan, Liebowitz & Latman, P.C.; Mark Montague (57) ABSTRACT

Provided is a measurement device that is highly accurate due to an optical configuration. The following are provided: a pattern projector that projects an optical pattern; and a pattern image receiver that receives the optical pattern which was projected. The pattern image receiver includes: a pattern image pickup unit that picks up an image of the optical pattern and converts the same to image pickup data; and a point coordinate value calculation unit that, on the basis of the converted image pickup data, calculates a 3D coordinate value for the position of the image pickup unit or a position known from the image pickup unit.

2 Claims, 5 Drawing Sheets

(51) Int. Cl.
*G01B 11/25* (2006.01)
*G01B 11/00* (2006.01)
*G06T 7/00* (2017.01)
*G06K 9/00* (2006.01)
*G01C 3/08* (2006.01)
*G06T 7/70* (2017.01)
*G06T 7/521* (2017.01)

(52) U.S. Cl.
CPC ............ *G01B 11/2513* (2013.01); *G01C 3/08* (2013.01); *G01C 15/06* (2013.01); *G06K 9/00496* (2013.01); *G06T 7/521* (2017.01); *G06T 7/70* (2017.01); *G06T 2207/30244* (2013.01)

(56) References Cited

U.S. PATENT DOCUMENTS

| | | |
|---|---|---|
| 2005/0099405 A1 | 5/2005 | Dietz et al. |
| 2008/0243416 A1 | 10/2008 | Bryll |
| 2012/0236317 A1* | 9/2012 | Nomura ............... G01B 11/026 356/610 |
| 2014/0028805 A1* | 1/2014 | Tohme ................ G01C 15/002 348/47 |
| 2014/0184914 A1* | 7/2014 | Oshima .................. H04N 5/445 348/564 |
| 2015/0138349 A1* | 5/2015 | Hebert .................... G01B 11/25 348/136 |
| 2015/0292876 A1* | 10/2015 | Pettersson ............. G01C 15/00 348/136 |

FOREIGN PATENT DOCUMENTS

| | | |
|---|---|---|
| JP | 2006-235725 A | 9/2006 |
| JP | 2008-052403 A | 3/2008 |
| JP | 2008-216180 A | 9/2008 |
| JP | 2008-256692 A | 10/2008 |

* cited by examiner

MEASUREMENT DEVICE

CROSS REFERENCE TO RELATED APPLICATIONS

This is a U.S. national stage of application No. PCT/JP2015/062708, filed on Apr. 27, 2015. Priority under 35 U.S.C. § 119(a) and 35 U.S.C. § 365(b) is claimed from Japanese Patent Applications No. 2014-094105, filed on Apr. 30, 2014 and 2015-090203, filed on Apr. 27, 2015, the disclosures of which are also incorporated herein by reference.

TECHNICAL FIELD

The present invention relates to a measurement device, and particularly relates to a measurement device capable of being used as a survey device measuring three-dimensional coordinates by projecting an optical pattern.

BACKGROUND ART

There has been a demand to measure various physical quantities mainly in the field of construction since before. Examples of the physical quantities include length, area, angle, volume, levelness, and the like. Examples of instruments for measuring these physical quantities include a measuring rod, a ruler, a measuring tape, a laser rangefinder, and the like, which measure a length, a protractor, a set square, a transit, and the like, which measure an angle, and a steel square, a level gauge, a plumb bob, and the like, which measure levelness and verticalness.

However, each of these instruments is dedicated to measuring a specific physical quantity. Taking the case of measuring length with a measuring tape, it is easy to measure the distance between specified two points and read the numerical value of the distance. However, it is difficult to perform measurement only with a measuring tape in "the case of determining the point vertically away from a wall by 2 meters", "the case of determining the point vertically away from a floor by 1 meter", and the like. In these cases, it is necessary to use a measuring tape in combination with a steel square, a plumb bob, or the like, and work of simultaneously using a plurality of instruments is extremely complicated. There are many other such cases, and there is a problem that although an instrument dedicated to a specific use is highly convenient for that use, it is not considered to use the instrument in combination with another instrument.

In addition, similarly, taking a measuring tape as an example, when the distance between specific two points is measured, in the case where the distance is beyond arm's reach of a human, work of fixing the origin of the measuring tape to one of the two points and then pulling the measuring tape toward the other point is necessary. Usually, a component for assisting fixation is attached to the origin of a measuring tape; however, the component is not versatile, and some arrangement is necessary for fixation of the origin in many cases. Then, after the length is measured, it is necessary to release the fixed origin of the measuring tape. Therefore, two steps, fixation and release of the origin, are necessary.

Furthermore, since a measurer himself intending to measure the distance has to go back and forth between two points at least once, man-hours taken for movement of the measurer cannot be ignored when the distance between the two points becomes large. In addition, it is difficult to linearly unroll the measuring tape other than by movement of the measurer in a case where a gap or the like exists between the two points.

Especially, like in the case of DIY (Do It Yourself), in the case where a worker carries out such a measurement by himself on site, the worker encounters the above difficulty.

As described, there is also the problem that man-hours of arrangements and movement of a measurer and the like, other than measuring work, which cannot be ignored, exist.

Regarding the problem associated with direct measurement of the above-described physical quantity by means of a dedicated instrument, since it is also possible to measure the three-dimensional coordinate values of the point to be a reference of physical quantity calculation and to calculate the physical quantity on the basis of the coordinate values, applying of a three-dimensional coordinate measurement technique to physical quantity calculation has been considered from the viewpoint of reduction in man-hours.

Conventionally, as techniques for measuring three-dimensional coordinates, a stereo camera (optical type), a mechanical type, a laser scanning type, and the like are general methods.

The stereo camera (optical type) is a camera configured to be able to measure distances in the vertical and horizontal directions and the depth direction with respect to the camera by simultaneously imaging an object from a plurality of different directions.

In the mechanical type, a contact or noncontact probe is mounted on the leading end of an articulated or linear motion mechanism, and a measurement target object is subjected to point measurement or line measurement by means of the probe, and therefore, three-dimensional coordinate values are calculated using the rotation angle of each joint axis in the case of the articulated motion mechanism, or the linear position of each axis in the case of the linear motion mechanism.

In the laser scanning type, three-dimensional coordinate values are calculated by determining the distance and the angle to the measurement target point according to the time taken for a laser beam to go back and forth and the projection direction of the laser beam.

In addition, there are various methods using radio waves, ultrasonic waves, and the like.

The inventor examined various methods and judged that an optical pattern projection type is excellent for usage which requires accuracy and strength against disturbance. Techniques for measuring two-dimensional coordinate values using an optical pattern are described in JP 2002-082763 A, and the like.

CITATION LIST

Patent Literature

{PTL 1} JP 2002-082763 A

SUMMARY OF INVENTION

Technical Problem

In the case of the two-dimensional coordinate measurement technique as described in PTL 1, a user specifies the target whose two-dimensional coordinates are to be measured with the tip portion of an optical pen, and therefore the technique is intuitive for the user. However, in the case of applying this technique to three-dimensional coordinate measurement, there is no guarantee that a pattern is always projected from the axial direction of the optical pen, and the user is forced to perform troublesome work of specifying the point whose coordinates are to be measured while taking into consideration the axial direction of the optical pen. In addition, it is necessary to spread a screen or the like having an optical pattern on the ground (or the floor) of the area where three-dimensional coordinate measurement is intended to be carried out, which is unrealistic requirement on a building site, a construction site, and the like. Furthermore, in the case of spreading a screen or the like having an optical pattern on a side surface (a wall or the like), a wide focus range is required for an optical system picking up an image of the optical pattern, and a focus adjustment mechanism may be required in some cases.

Due to these circumstances, it is difficult to perform three-dimensional coordinate measurement using the optical pattern projection type.

Solution to Problem

Therefore, the present invention is made in order to solve the above-described problem.

A first aspect of the present invention is characterized in that a measurement device includes: a pattern projector projecting an optical pattern; and a pattern image receiver receiving the projected optical pattern, the pattern image receiver including: a pattern image pickup unit picking up an image of the projected optical pattern and converting the pattern into image pickup data; and a point coordinate value calculation unit calculating three-dimensional coordinate values of a position of the pattern image pickup unit or a position known from the pattern image pickup unit on the basis of the converted image pickup data.

According to this configuration, since the pattern image receiver can directly receive the image of an optical pattern projected by the pattern projector and can calculate three-dimensional coordinate values, it is possible to perform efficient physical quantity measurement using the pattern projector and the pattern image receiver according to the use environment.

Also, in the present invention, it is preferable that the pattern image receiver is portable, and includes the point coordinate value calculation unit and a display unit displaying calculated three-dimensional coordinate values of a position of a pattern image pickup unit or a position known from the pattern image pickup unit.

According to this configuration, since it is possible for the pattern image receiver to be carried and to calculate and display three-dimensional coordinate values on a building site or the like, even only one person can perform physical quantity measurement according to the work environment.

Also, in the present invention, it is preferable that the projected optical pattern is configured of a plurality of elements, identification information is encoded in each of the plurality of elements, the point coordinate calculation value unit includes means for deriving identification information of an element included within the optical pattern by decoding the image pickup data, and calculating three-dimensional coordinate values of a position of the pattern image pickup unit or a position known from the pattern image pickup unit using the identification information.

According to this configuration, it is possible to calculate three-dimensional coordinate values using identification information included in an optical pattern.

Also, in the present invention, it is preferable that the element is configured of a plurality of light spots, and the identification information is encoded in an arbitrary combination of brightness, a wavelength, a position, and a time change of the light spot.

According to this configuration, information other than physical resolution can also be encoded in light spots, and it is possible to measure more accurate three-dimensional coordinate values.

Advantageous Effects of Invention

According to the present invention, highly-accurate three-dimensional coordinate measurement is made possible. In addition, by applying a measurement device for three-dimensional coordinates of the present invention, an arbitrary physical quantity can be calculated at high accuracy.

DESCRIPTION OF EMBODIMENTS

Hereinafter, a measurement device according to the present invention will be described with reference to the drawings.

Note that, before a detailed description of the present invention will be given, a known technique described in the prior art literature (PTL 1) will be briefly described.

In the prior art, coordinate value information of a plane coordinate system is embedded in an optical pattern planarly projected (on paper or the like), plain coordinate values of the location of a reader when this coordinate information is read by the reader is obtained, and therefore coordinate values of the reader on the planar coordinate system is grasped.

In addition, the same applies to the configuration of reading an optical pattern projected on space by an overhead projector or the like.

Both disclose reading of an planarly configured optical pattern and acquiring of two-dimensional coordinate values of a vertical plane with respect to an optical axis of a light emitting unit; however, neither discloses nor mention a concept of extending application of the above to a three-dimensional coordinate system.

Note that since details of the above-described prior art is described in PTL 1, the details will not be mentioned below in the present invention.

Figure 1:
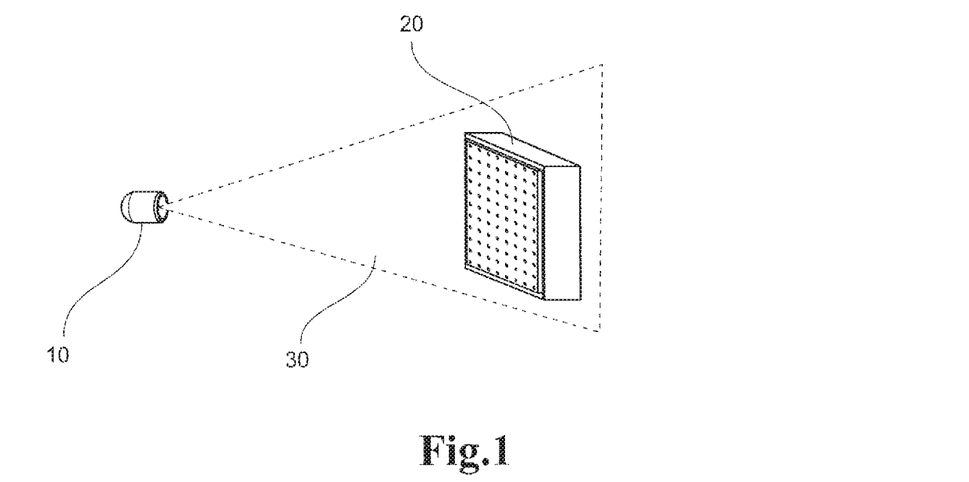
FIG. 1 is a diagram illustrating a concept of three-dimensional coordinate measurement used in a survey device of the present invention.

FIG. 1 is a diagram illustrating a concept of three-dimensional coordinate measurement used in a measurement device of the present invention. What is important in this invention is that a pattern projector 10 projects a specific optical pattern to space, a pattern image pickup unit 21 of a pattern image receiver directly picks up an image of the optical pattern, and an image analysis of the image pickup result is performed so as to obtain three-dimensional coordinate values of the image pickup unit of the image receiver.

Therefore, three-dimensional coordinate values described herein mean coordinate values in a local three-dimensional coordinate system using the pattern projector 10 as a reference. It is noted that in the case where the coordinate values of the position where the pattern projector 10 exists in another coordinate system (for example, latitude/longitude of the earth) is known, coordinate-system conversion can be performed by adding the coordinate values in the other coordinate system to the coordinate values of the local three-dimensional coordinate system. For example, if the pattern projector 10 is provided with a receiving device of a positioning satellite system, coordinate-system conversion can be performed by adding the coordinate values of the pattern image receiver 20 to the coordinate values of the pattern projector 10, and such a coordinate system may be preferably displayed depending on usage.

Figure 2:
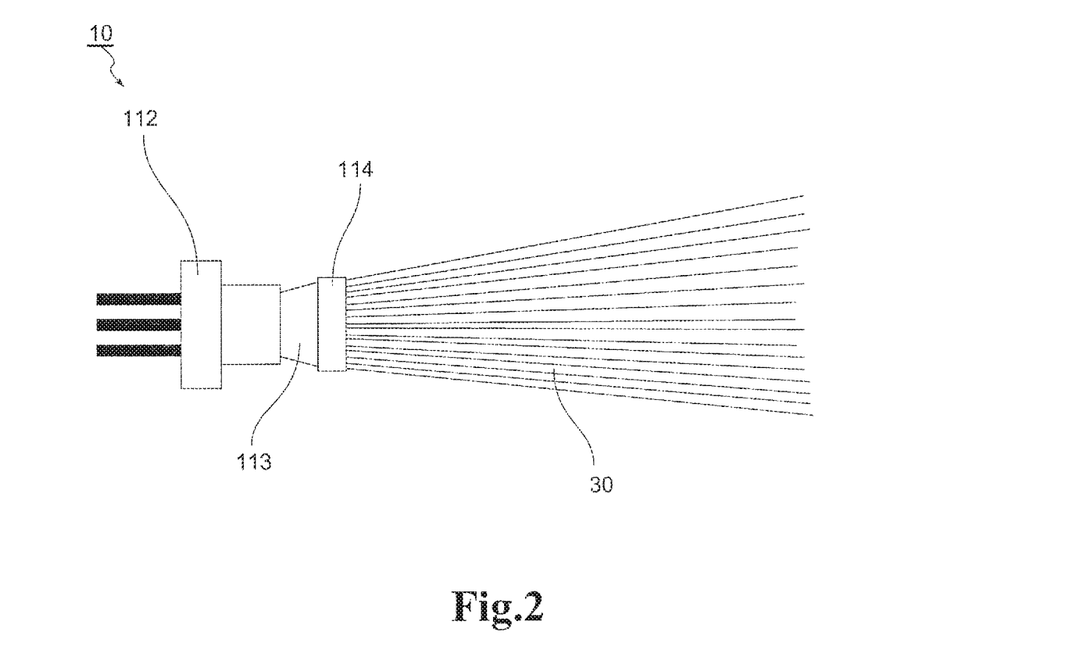
FIG. 2 is a diagram illustrating an optical configuration of a pattern projection mechanism.

FIG. 2 is a diagram explaining an optical configuration of an optical pattern projection mechanism in the pattern projector 10. The optical pattern projection mechanism includes a light emitting element 112 and an optical element 114 forming an optical pattern. Light 113 emitted from the light emitting element 112 passes through the optical element 114 and becomes a projected pattern 30.

Examples of the light emitting element 112 include an LED (light emitting diode), a laser oscillation element, and the like. The optical element 114 is a kind of an optical filter, and has a function of projecting light 113 emitted from the light emitting element 112 in a specific pattern to space. Examples of the optical element 114 as described above include a microlens array, a diffraction grating, pinholes arrayed in a lattice shape, and the like. In addition, a DMD (Digital Micromirror Device) as an optical modulation element can also be used as the optical element 114.

Here, terms will be defined in detail.

In the present invention, "optical pattern" means a pattern itself intended to be projected on space in the optical element 114.

In the present invention, "projected pattern" means the light 113 emitted from the light emitting element 112, passing through the optical element 114 and actually projected to space.

In the present invention, "incident pattern" means a portion of the projected pattern 30 projected to space, the portion being incident on the pattern image pickup unit 21.

Figure 3:
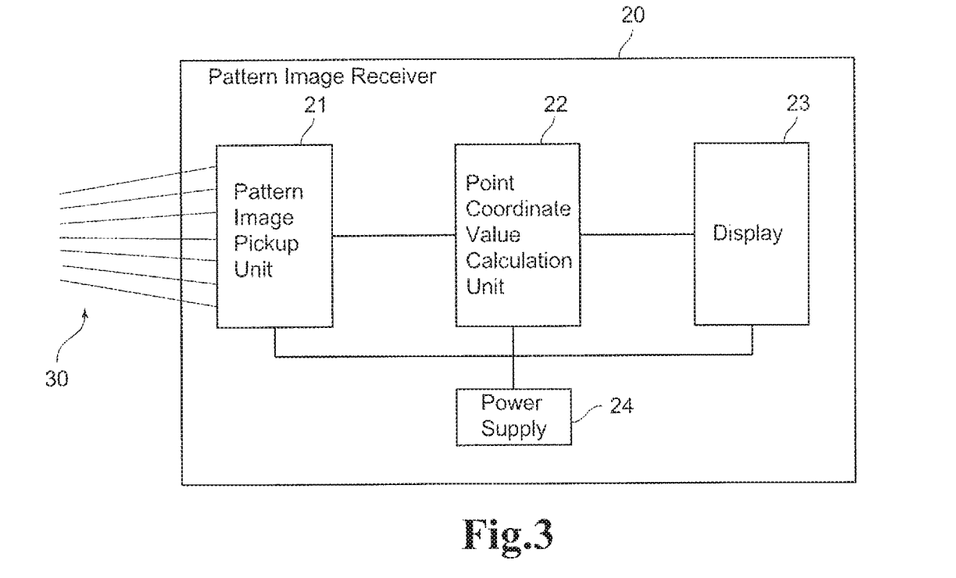
FIG. 3 is a diagram illustrating a configuration of a pattern image receiver.

FIG. 3 is a diagram illustrating a configuration of the pattern image receiver 20. The pattern image receiver 20 according to an embodiment of the present invention receives an image of the projected pattern 30 projected from the pattern projector 10, and calculates three-dimensional coordinate values from the image pickup data of the pattern and displays the values. The pattern image receiver 20 includes a pattern image pickup unit 21 receiving an image of an optical pattern and converting the pattern to image pickup data, a point coordinate value calculation unit 22 calculating coordinate values on the basis of the received image of the optical pattern, a display unit 23 displaying the calculated coordinate values, a power supply 24 supplying power to these units. The pattern image receiver 20 according to the present embodiment is a portable device capable of being moved and measuring coordinates.

Figure 4:
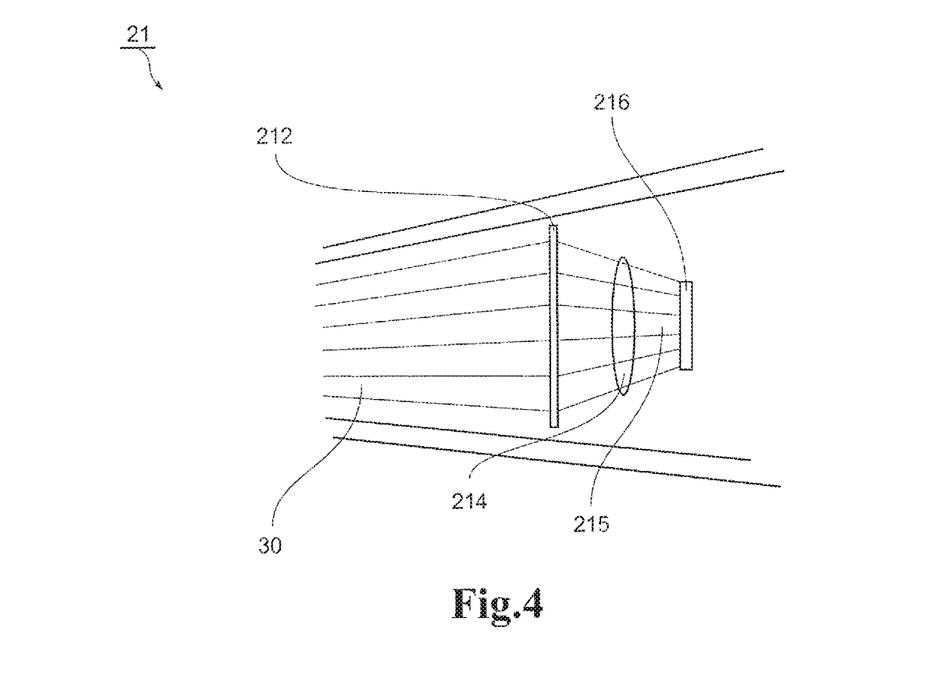
FIG. 4 is a diagram illustrating an optical configuration of a pattern image pickup unit.

FIG. 4 is a diagram explaining an optical configuration of the pattern image pickup unit 21 of this pattern image receiver 20. The pattern image pickup unit 21 includes an image receiving screen 212, a lens 214, and an image pickup element 216. An image sensor such as a CMOS sensor, a CCD sensor, and the like is used as the image pickup element 216.

Here, a portion of the projected pattern 30, the portion being incident on the image receiving screen 212, becomes an incident pattern 215. In reality, the portion incident on the image receiving screen is imaged by the image pickup element 216 via the lens 214, and the image pickup element 216 converts the incident pattern into image pickup data. As a result, the image of the incident pattern 215 is formed at the image pickup element 216, is converted into image pickup data as image data, and is taken into the point coordinate value calculation unit 22.

Figure 5:
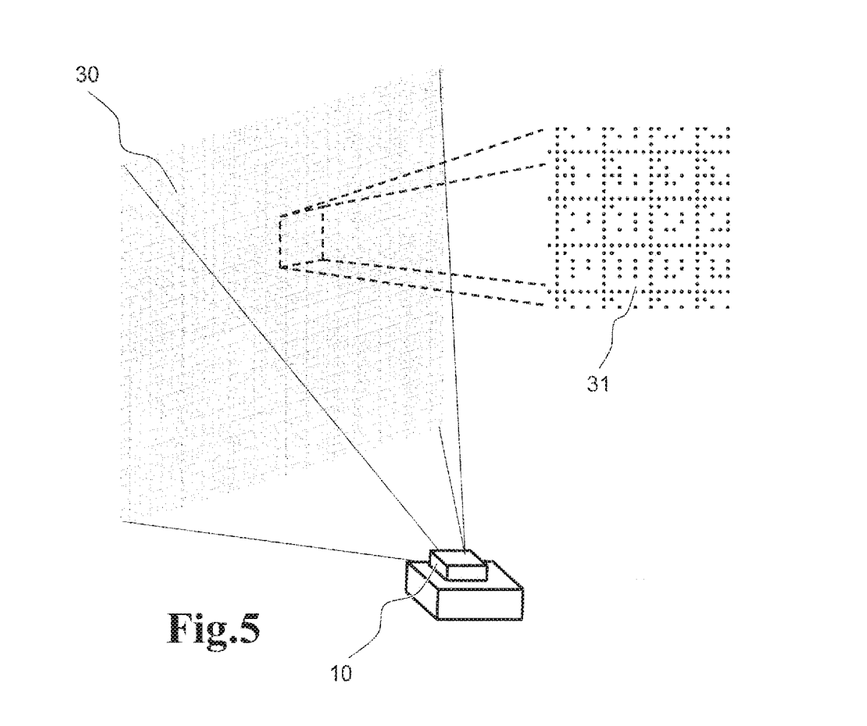
FIG. 5 is a diagram exemplifying an outline of a projected pattern.

FIG. 5 illustrates a specific example of the projected pattern 30. In the case where the light emitting element 112 emits visible light, if the projected pattern 30 projected to space from the pattern projector 10 is projected on a screen, a wall, or the like as illustrated in the figure, the optical pattern can be observed as it is. A projected pattern (enlarged) 31 is obtained by enlarging a portion of the projected pattern. In the case of this example, light spots are arranged according to a specific rule. If the pattern image pickup unit 21 can pick up the image of light spots of a certain amount or greater, plane coordinates on the optical pattern space where the light spots are arranged can be determined.

Figure 6:
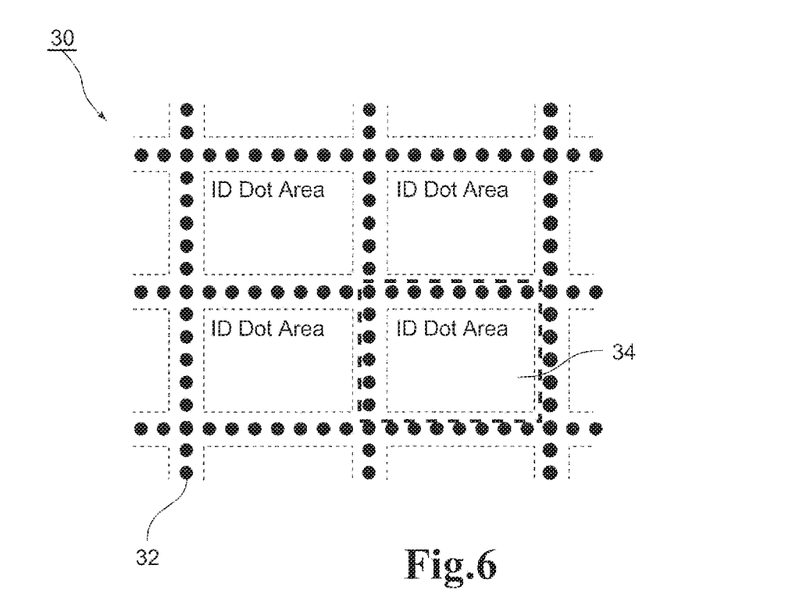
FIG. 6 is a diagram illustrating a structure of the projected pattern.

FIG. 6 is a diagram illustrating an example about the optical pattern in the present invention. The projected pattern 30 projected from the pattern projector 10 can be considered as a pattern spread on a plane vertical to the optical axis of the pattern projector 10.

At that time, the optical pattern has a plurality of ID blocks 34 each configured of measurement dots 32 and an ID dot area (to be described later).

The measurement dots 32 constitutes a kind of a frame formed of light spots (plural) configuring an optical pattern, and a lattice shape is formed of the plurality of measurement dots 32. The point coordinate value calculation unit 22 detects the frame formed of the measurement dots 32 when performing the image analysis of an incident pattern and computing coordinate values.

Since an ID for identifying the area is encoded in each ID dot area, each area has a different ID, and as a result, the ID dot areas differ in pattern from one another.

Figure 7:
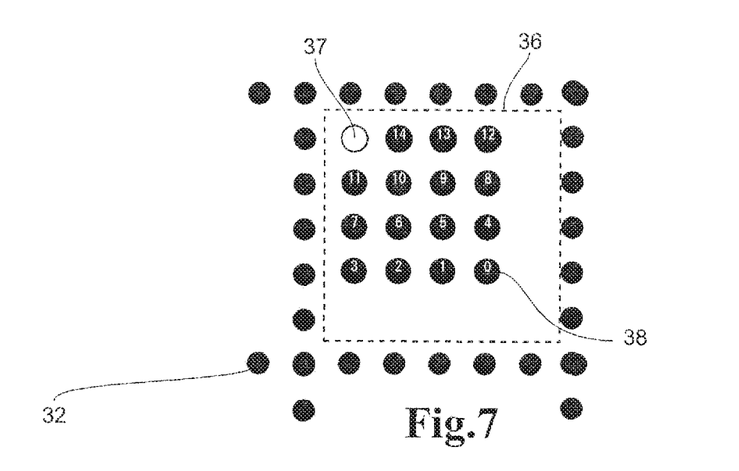
FIG. 7 is a diagram illustrating details of the projected pattern.

FIG. 7 is an enlarged view of one ID block 34.

An ID dot area 36 exists in the frame formed of the measurement dots 32. In the ID dot area 36, an ID origin dot 37 and ID dots 38 (plural) exist. The ID origin dot 37 serves as an origin when representing information encoded in the ID dot area 36, and in general, is always in an On-state (exists as a light spot). The ID dots 38 represent encoded information in the case of setting the ID origin dot 37 to the origin. On (light spot) and off (non-light spot) of the ID dot 38 is freely selected for each dot depending on information to be encoded.

As an example, numbers 0 to 14 are assigned to the ID dots 38 in FIG. 7. These ID dots 38 indicate powers of 2 in binary. In the case where the ID dots 38 in order starting from the ID dot 38 with the number 14 represent "111001111001010", it follows that the numerical value, hexadecimal 73CA, is encoded.

By linking the above-described encoded numerical value with coordinate values in the plane coordinate system of the optical pattern space, plane coordinate values are derived. The coordinate values themselves may be encoded.

In the ID dot area 36, there is space corresponding to 5×5 dots considering the interval between the measurement dots 32 as a reference; however, the origin dot 37 and the ID dots 38 occupy only the space corresponding to 4×4 dots, and the remaining space is not used (not illuminated) in order to identify vertical and horizontal directions of the optical pattern space in the case of tilting the pattern image pickup unit 20 in the direction of rotating the pattern image pickup unit 20 with respect to the optical axis.

These sacrifice space efficiency in order to give an easy-to-understand explanation in terms of appearance; however, in reality, an encoding method with higher space use efficiency may be adopted.

In the case where the incident pattern 215 is guided to the image pickup element 216 in a state where the image receiving screen 212 of the pattern image pickup unit 21 is in parallel to the plane vertical to the optical axis of the projected pattern 30, the measurement dots 32, the ID origin dot 37, and the ID dots 38 are arranged in a lattice shape where intervals between any two of them are the same. The interval changes depending on the distance from the pattern projector 10 to the image receiving screen 212. In a general optical system, the lattice interval changes in direct proportion to the distance. Thus, the distance from the pattern projector 10 to the image receiving screen 212 can be calculated from the lattice interval, and the distance from the pattern projector to the pattern image pickup unit can be measured.

Furthermore, in the case where the incident pattern 215 is guided to the image pickup element 216 in a state where the image receiving screen 212 of the pattern image pickup unit 21 is inclined with respect the plane vertical to the optical axis of the projected pattern 30, the intervals between any two of the measurement dots 32, the ID origin dot 37, and the ID dots 38 form a distorted lattice shape. On the basis of the distortion of intervals, the degree of inclination of the image receiving screen 212 with respect to the plane vertical to the optical axis of the projected pattern 30 can be calculated.

Note that although a description with reference to the drawings will be omitted, it is not necessary to limit the present invention to the technique of the above-described optical pattern (=projected pattern 30), where block IDs are encoded in the planar direction. A pattern projector 10 which can emit light so that light emitting wavelengths are different for each dot may be provided to perform wavelength encoding, or a pattern projector 10 which can arbitrarily control on/off (or a light quantity) of light emission for each dot may be provided to perform a different type of encoding. In this case, not a configuration like the above-described configuration (using an LED or the like as the light emitting element 112, and using a microlens array or the like as the optical element 114), but the configuration where a light beam from a matrix-type LED provided with a lens and configured by integrating the light emitting element 112 and the optical element 114 or a light beam from an optical scanning device capable of emitting light of a plurality of wavelengths is projected to a matrix mirror of MEMS (Micro Electro Mechanical Systems), or another configuration is used.

By adopting these configurations, since the light quantity and the wavelength of each light spot can be arbitrarily controlled, the same amount of information can be represented with fewer light spots, and it is possible to increase space-use density of the ID block 34 and to improve the accuracy of coordinate measurement. Furthermore, by applying the aforementioned "function of arbitrarily controlling the light quantity and the wavelength for each light spot", it is also possible to perform control so as to change the light quantity and the wavelength of each light spot with the lapse of time.

Examples of the method for changing each light spot with the lapse of time include a method of replacing a portion or the whole of the optical pattern (where the light quantity and the wavelength of each light spot can be individually set) with a different optical pattern by a fixed time unit, and the method of changing the light quantity and/or the wavelength at different cycles for each light spot. In these methods, since it is possible to calculate the light quantity and the wavelength of the optical pattern at a specified time by calculation, information encoded in the ID block 34 can be calculated by performing inverse operation on the basis of the change in the light quantity and the wavelength of the light spot included in the incident pattern 215 the image of which is picked up by the image pickup element 216.

In addition, in these methods, other information which is not originally encoded in the ID block 34 (hereinafter, "additional information") can also be encoded in the measurement dot 32 or the ID origin dot 37. For example, if a signal serving as a reference for a time change, such as a CLK (clock) signal in a synchronous serial communication, a timing for detecting the change in light quantity and wavelength of each light spot included in the ID block 34 becomes clear, the amount of information for each unit time capable of being encoded in one light spot increases, and as a result, the ID block 34 can also be configured of fewer light spots. In the case of superimposing only the CLK signal as the additional information, it is possible to abolish the concepts such as the measurement dot 32 and the ID origin dot 37 and to allocate all the light spots to the ID block 34. In this case, the CLK signal is encoded into a light quantity component of a light spot and the original information is encoded into a wavelength component.

The point coordinate value calculation unit 22 includes an arithmetic processor. The point coordinate value calculation unit 22 processes images of patterns converted into image pickup data by the pattern image pickup unit 21, and therefore calculates relative three-dimensional coordinate values of the pattern image pickup unit 21 with respect to the pattern projector 10. In addition, a point at a predetermined position from the pattern image pickup unit 21 can be specified as a measurement point, for example the point at a position to be calculated can be specified with a sharp tip portion of a writing implement-type pattern image receiver 20, and the coordinate values of the point can be calculated by adding the specified point to the coordinate values of the pattern image pickup unit 21. Furthermore, in the case where the pattern image receiver 20 is a portable type and includes the point coordinate value calculation unit 22 and the display unit 23, it is possible to display the measured coordinate values on the display unit 23.

Figure 8:
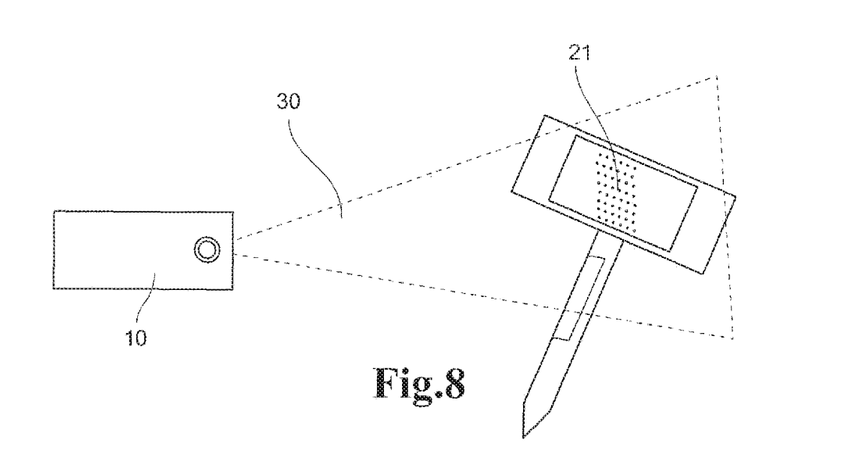
FIG. 8 is a diagram illustrating an example of three-dimensional coordinate measurement used in a measurement device of the present invention.

FIG. 8 illustrates a further specific concept of the three-dimensional measurement device of the present invention explained in FIG. 1.

In this example, a pattern projector 10 is installed at a specified location and is not moved during a series of measurement work. A writing implement-type device including a pattern image pickup unit 21 is a pattern image receiver 20 serving as a mobile terminal for measuring three-dimensional coordinate values, and measures the coordinate values of the sharp tip portion thereof.

A measurer grasps this pattern image receiver (mobile terminal) 20, points the tip portion thereof at a point whose coordinate values are intended to be measured, and presses down a switch for giving an instruction to perform coordinate measurement. At that time, the incident pattern 215 incident on the pattern image pickup unit 21 is analyzed, and relative three-dimensional coordinate values with the pattern projector 10 as a reference can be obtained.

Especially, as described above, since the distance from the pattern projector 10 and the inclination of the pattern image pickup unit 21 can be calculated, coordinates of the tip located at a position known from the image receiving screen 212 can be easily derived.

Figure 9:
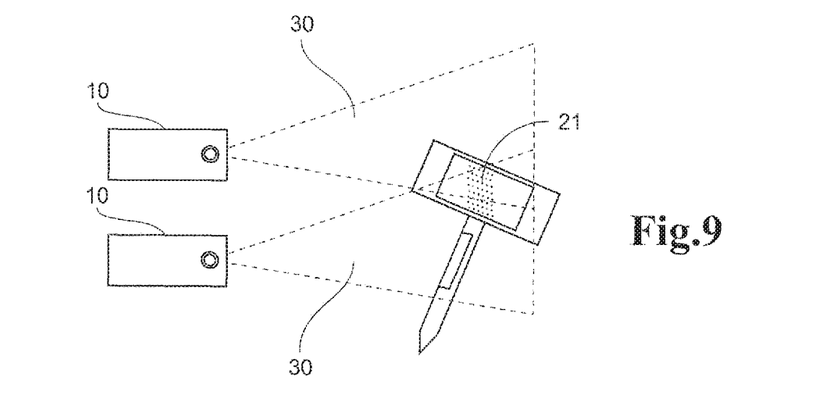
FIG. 9 is a diagram illustrating an example of three-dimensional coordinate measurement used in a measurement device of the present invention.

FIG. 9 illustrates a device obtained by improving the device of FIG. 8 and provided with two pattern projectors 10. Since relative positions of the two pattern projectors 10 are known, coordinate measurement accuracy of a pattern image receiver 20, which is a mobile terminal for measuring three-dimensional coordinate values, is further improved.

Note that three or more pattern projectors 10 may be provided.

In the case of operating a plurality of pattern projectors 10, in order to distinguish pattern projections from respective pattern projectors 10 from one another, the pattern projector 10 performing pattern projection may be switched over to another for each short time period, or pattern projection may be performed with the same duty ratio and different light-emission timing frequencies for each pattern projector 10.

In addition, the wavelength of light emitted from one of the plurality of pattern projectors 10 may be different from the wavelength of light emitted from another pattern projector 10.

Figure 10:
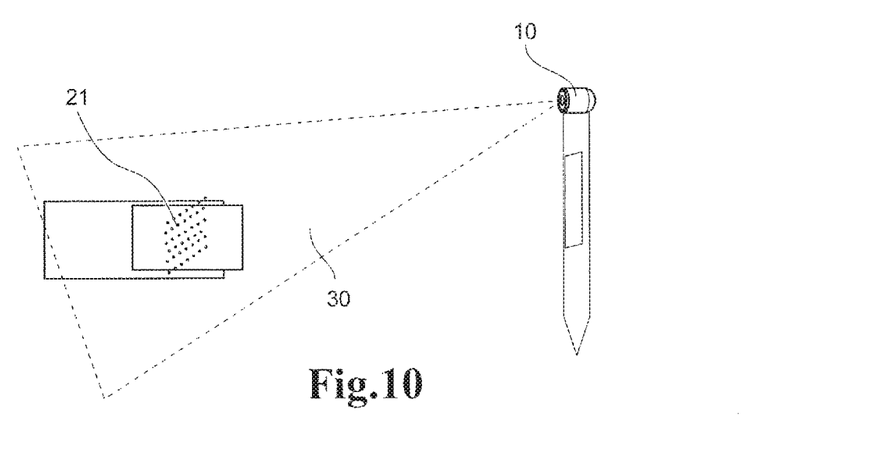
FIG. 10 is a diagram illustrating an example of three-dimensional coordinate measurement used in a measurement device of the present invention.

FIG. 10 illustrates the case of replacing the pattern projector 10 and the pattern image pickup unit 21 of the device of FIG. 8 with each other. This is effective in the case where the size of a pattern image pickup unit 21 is intended to be increased.

Figure 11:
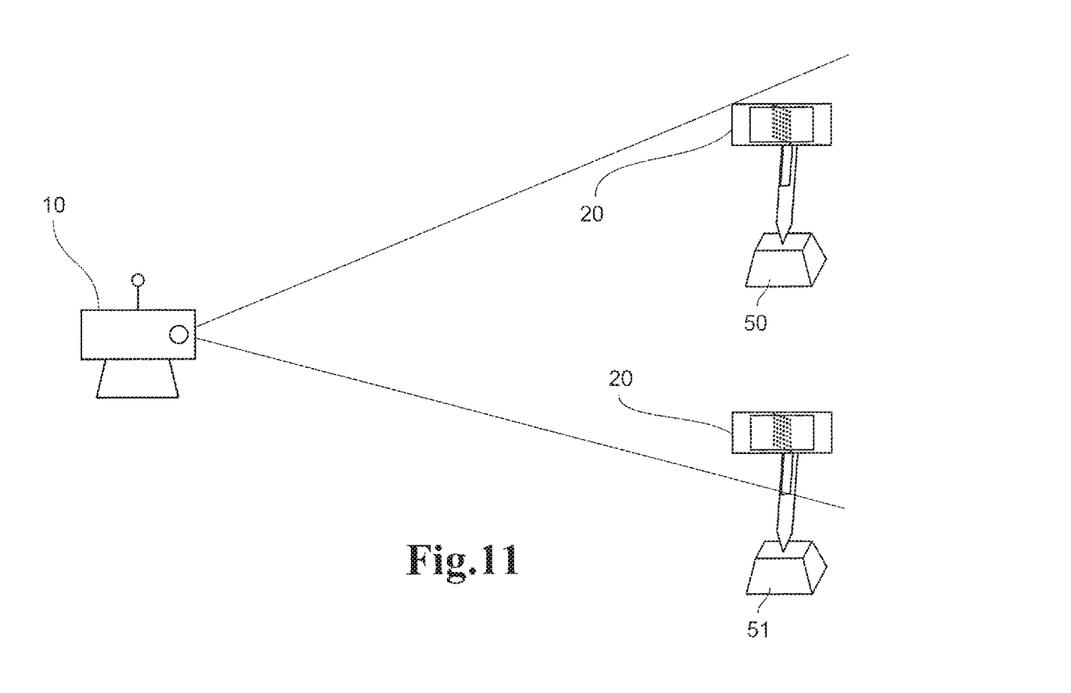
FIG. 11 is a diagram illustrating an example of performing three-dimensional coordinate measurement using the measurement device of the present invention.

FIG. 11 is a diagram explaining an example where the pattern projector and the pattern image receiver 20 serving as a mobile terminal according to the present invention are used as a survey device. FIG. 11 is a diagram explaining the case of making a survey while providing bases 50 and 51 at predetermined intervals using the pattern projector 10 as a reference point (origin). In this case, the reference base 50 is placed, the pattern image receiver 20 is brought into contact with the reference base 50, an optical pattern from the pattern projector 10 is received, and local three-dimensional coordinate values of the reference base 50 using the pattern projector 10 as a reference is obtained. Then, if the reference base 51 is placed and the pattern image receiver 20 is brought into contact with the reference base 51, local three-dimensional coordinate values of the reference base 51 is obtained. If the position of the reference base 51 is adjusted on the basis of a design drawing and on the basis of the obtained (displayed) three-dimensional coordinate values, it is possible for even one person to carry out work without using a survey instrument such as a measuring tape or the like.

In addition, in the measurement device of the present invention, although the accuracy depends on the accuracy of the optical element which generates a pattern and the resolution of the image pickup element, it is theoretically possible to obtain positional accuracy in the order of $\mu$m. Therefore, the measurement device can be used, for measuring the length of a workpiece in a machine tool or the like, as a substitute for a scale. Especially, since coordinate values of a fixed structure can be obtained by bringing the tip of the pattern image receiver 20 into contact with the structure, the length, the position, and the like of the structure can be accurately and easily measured.

The present invention has been described above exemplifying preferred embodiments thereof; however, the present invention is not limited to the embodiments, and it is needless to say that many modifications can be made without deviating from the spirit of the invention.

INDUSTRIAL APPLICABILITY

A measurement device capable of being reduced in size and improved in definition can be provided using an optical device capable of being mass-produced, and there is the effect of being able to efficiently perform three-dimensional coordinate measurement work using this device, and other effects.

REFERENCE SIGNS LIST

10: pattern projector
112: light emitting element
113: light emitted from light emitting element
114: optical element
20: pattern image receiver
21: pattern image pickup unit
212: image receiving screen
214: lens
215: incident pattern
216: image pickup element
22: point coordinate value calculation unit
23: display unit
24: power supply
30: projected pattern
31: projected pattern (enlarged)
32: measurement dot
34: ID block
36: ID dot area
37: ID origin dot
38: ID dot
50, 51: base

The invention claimed is:
1. A measurement device comprising:
a pattern projector configured to project an optical pattern to space; and
a pattern image receiver configured to receive the projected optical pattern, the pattern image receiver including:
a pattern image pickup unit configured to pick up an image of the projected optical pattern and to convert the image picked up into image pickup data;
a point coordinate value calculation unit configured to calculate three-dimensional coordinate values of a measurement point on which the pattern image receive s disposed on the basis of the converted image pickup data; and a display unit configured to display the three-dimensional coordinate values calculated by the point coordinate value calculation unit;

which is characterized in that:

the pattern image receiver is configured to be portable and to be disposed on the errant point with locating the pattern page pickup unit at a predetermined distance from the measurement point;

the projected optical pattern comprises a plurality of blocks of dot patterns arranged in a predetermined interval and indicating locations in the projected optical pattern;

the point coordinate calculation value unit is configured to derive a distance from the pattern projector to the pattern image pickup unit on the basis of intervals of a dot pattern picked up by the pattern image pickup unit, a degree of inclination of the pattern image pickup unit with respect to the optical axis of the projected pattern on the basis of a distortion of the intervals of the dot pattern picked up by the pattern image pickup unit, and two-dimensional coordinate values in a plane coordinate system of the projected optical pattern from the dot pattern picked up by the pattern image pickup unit; and the point coordinate calculation value unit is further configured to calculate the three-dimensional coordinate calculation values of the measurement point on the basis of distance from the pattern projector to the pattern image pickup unit, the degree of inclination of the pattern image pickup unit and the two-dimensional coordinate values in the plane coordinate system of the projected optical pattern.

2. The measurement device according to claim 1, wherein each of the dot patterns comprises a plurality of light spots indicating a coordinate value in the plane coordinate system by a combination of brightness, wavelength, position and/or time variation of each light spot.

* * * * *